US006938944B2

(12) United States Patent
Koa et al.

(10) Patent No.: US 6,938,944 B2
(45) Date of Patent: Sep. 6, 2005

(54) WATER SHIELD WITH INTEGRATED 3-D MIRROR SEAL

(75) Inventors: Chi H. Koa, West Bloomfield, MI (US); Quoc H. Nguyen, Belleville, MI (US)

(73) Assignees: Foamade Industries, Inc., Auburn Hills, MI (US); Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 10/760,958

(22) Filed: Jan. 20, 2004

(65) Prior Publication Data

US 2005/0156450 A1 Jul. 21, 2005

(51) Int. Cl.$^{7}$ .................................................. B60J 5/04

(52) U.S. Cl. ..................... 296/152; 296/154; 296/1.11; 49/502

(58) Field of Search ........................... 296/39.2, 146.1, 296/146.7, 152, 154, 1.11; 49/502; 248/466, 248/475

(56) References Cited

U.S. PATENT DOCUMENTS 4,253,543 A 3/1981 Johansson
4,392,548 A 7/1983 Bailey
4,432,167 A * 2/1984 Watanuki ..................... 49/502
4,769,188 A 9/1988 Graham et al.
4,790,590 A * 12/1988 Ito et al. ................. 296/146.1
4,957,803 A 9/1990 Foley
5,697,665 A * 12/1997 Itou et al. ................ 296/146.1
5,931,682 A 8/1999 Takiguchi et al.
6,007,890 A 12/1999 DeBlander
6,123,385 A 9/2000 Bailey et al.
6,207,754 B1 3/2001 Yu
6,213,537 B1 * 4/2001 Butz et al. .................. 296/152
6,382,350 B1 5/2002 Jezewski et al.
6,390,841 B1 5/2002 Zaguskin
6,422,640 B2 7/2002 Whitehead et al.
6,428,081 B1 8/2002 Williams, Jr. et al.
6,449,907 B2 * 9/2002 Nishikawa et al. ........... 49/502
6,552,095 B1 4/2003 Tochioka et al.
6,631,940 B2 * 10/2003 Dauvergne et al. ...... 296/146.6
6,725,606 B2 * 4/2004 Nishikawa et al. ........... 49/502
2001/0017476 A1 * 8/2001 Nishikawa et al. ...... 296/146.6
2002/0007598 A1 * 1/2002 Nishikawa et al. ........... 49/502

* cited by examiner

*Primary Examiner*—Patricia L. Engle
(74) *Attorney, Agent, or Firm*—Harness, Dickey & Pierce, P.L.C.

(57) ABSTRACT

A molded water shield integrated between an exterior panel assembly and a trim panel of a vehicle includes a semi-rigid barrier sheet and a seal integrally molded into the semi-rigid barrier sheet. The seal includes reliefs formed therein and is detachable from the semi-rigid barrier sheet to define an opening through the semi-rigid barrier sheet.

26 Claims, 4 Drawing Sheets

WATER SHIELD WITH INTEGRATED 3-D MIRROR SEAL

FIELD OF THE INVENTION

The present invention relates to vehicle door assemblies, and more particularly to a water shield having an integrated mirror seal for a vehicle door assembly.

BACKGROUND OF THE INVENTION

A vehicle door typically comprises an exterior panel that is formed of an outer, generally curved, exterior sheet of metal or plastic. The exterior panel conforms to the exterior surface of the body of the vehicle. An inner surface is formed on the panel by a metal sheet whose edges are peripherally secured to the outer sheet. The inner sheet is typically formed with a large central opening for access to a cavity provided between the sheets within the exterior door panel. A slot is formed at the upper edges of the two sheets for receiving a sheet of glass. The glass sheet may be lowered into the cavity between the sheets for opening the window, or it may be raised upwardly for closing the window. Alternatively, the glass may be immovably fixed in the window opening with only its lower portion extending downwardly towards the cavity.

Various components are positioned within the cavity and may include a window mechanism for manually raising and lowering the window, a powered mechanism for raising and lowering the window by an electrical motor and drive system, and locking mechanisms for the door, door handle components, side view mirror attachment and adjustment components, and the like.

A trim panel covers the cavity of the exterior panel is made of a sheet material that is of a size and shape to overlap and cover the interior surface of the exterior door panel. The trim panel may be formed of a thermoplastic material or a cloth type of material or a combination of both materials. Typically, the trim panel is molded or otherwise formed with a contoured or irregular surface that includes depressions, bosses, curved areas and the like. The peripheral edge of the trim panel is secured to the interior surface of the door panel by mechanical fasteners that can be disengaged so that the trim panel may be manually removed for providing access to the door components. Additionally, acoustic components such as stereo speakers can be mounted to the trim panel.

A water barrier or water shield is provided and is formed of a relatively thin flexible, water impervious, plastic sheet which is cut to the size and shape necessary for covering the respective surfaces. Traditionally, the sheet adheres to one or both of the adjacent door panels or trim panel surfaces. The water shield prevents dirt, dust and/or water from leaking into the vehicle through the vehicle door assembly.

Other vehicle components such as side-view mirrors incorporate water shields. Manufacture of multiple water shields requires multiple molding, part numbers, logistics, etc. Each of these increase overall production cost and inefficiency.

SUMMARY OF THE INVENTION

Accordingly, the present invention provides a molded water shield integrated between an exterior panel assembly and a trim panel of a vehicle. The molded water shield includes a semi-rigid barrier sheet and a seal integrally molded into the semi-rigid barrier sheet. The seal includes reliefs formed therein and is detachable from the semi-rigid barrier sheet to define an opening through the semi-rigid barrier sheet.

In one feature, the semi-rigid barrier sheet and the seal are formed of a water resistant material.

In another feature, the semi-rigid barrier sheet and the seal are formed of any thermally formable material, desirably a thermoplastic polymeric material and preferably a thermoplastic olefin (TPO). The TPO comprises a cross-linked polypropelene and polyethylene blend.

In another feature, the molded water shield further includes a linear low density polyethylene film and a silicon-based coating applied to surfaces of the semi-rigid barrier sheet and the seal.

In still another feature, the molded water shield further includes a pressure sensitive adhesive material that adhesively engages the semi-rigid barrier and the panel assembly.

In yet another feature, the reliefs enable indexing of the seal for assembly into a mirror assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
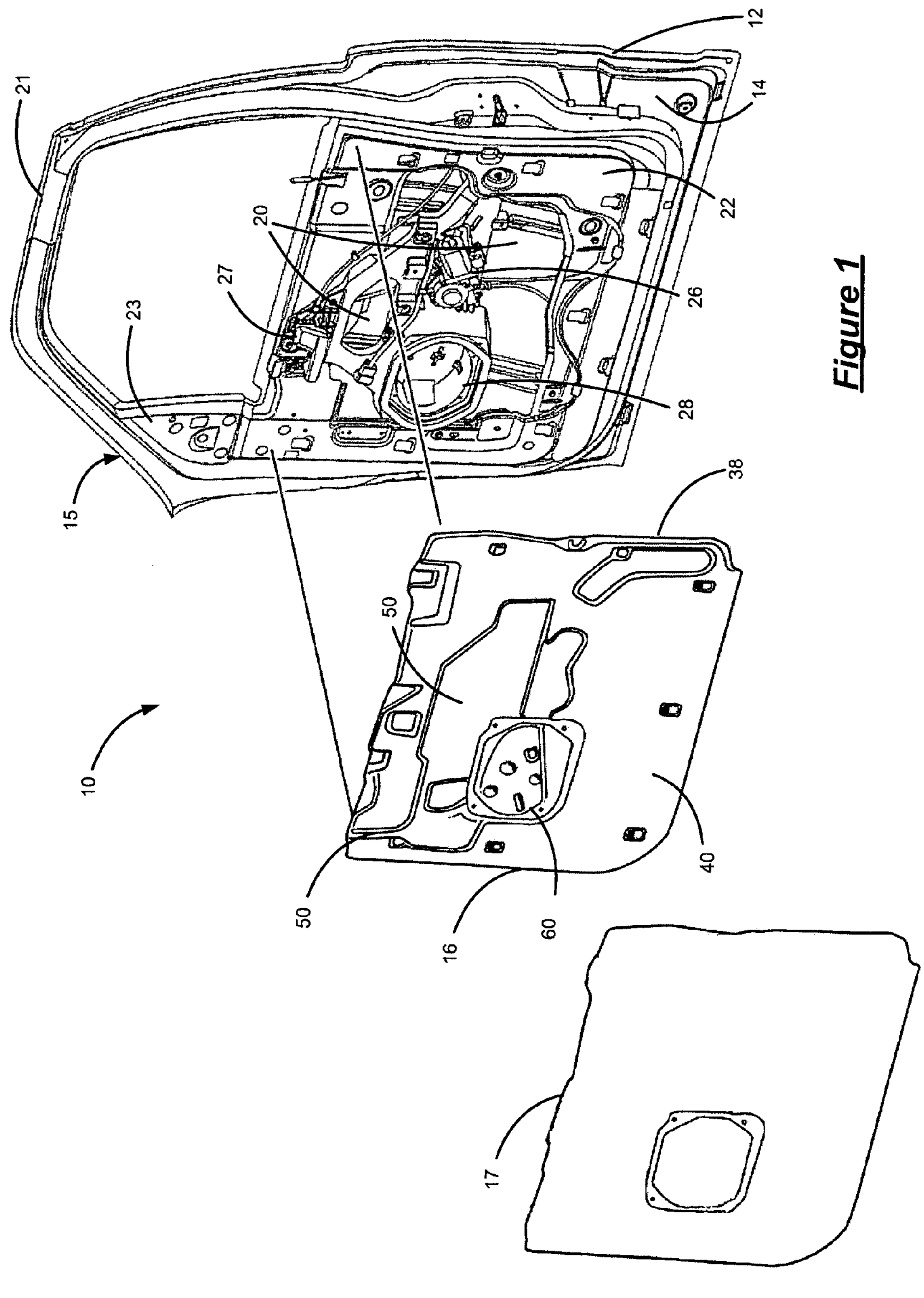
FIG. 1 is an exploded view of a vehicle door assembly including a molded water shield according to the present invention.

The following description of the preferred embodiment is merely exemplary in nature and is in no way intended to limit the invention, its application, or uses. For purposes of clarity, the same reference numbers will be used in the drawings to identify similar elements.

Figure 2:
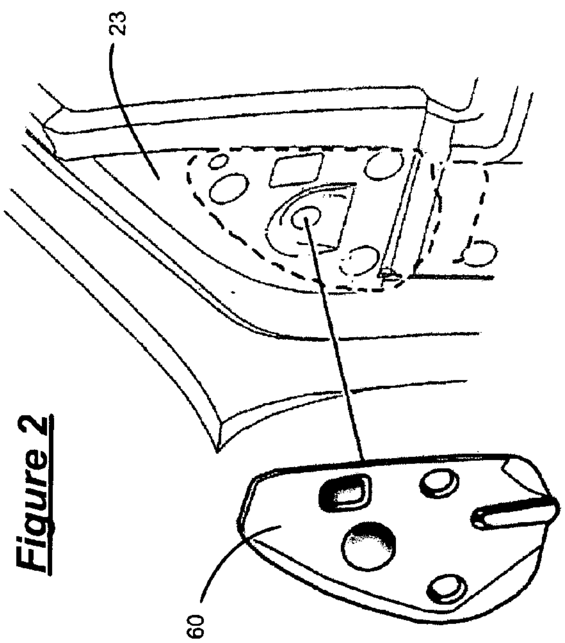
FIG. 2 is a more detailed view of the vehicle door assembly illustrating attachment of a three-dimensional (3D) mirror seal.

Referring now to FIGS. 1 and 2, a vehicle door assembly 10 is shown. The door assembly 10 includes an exterior panel 12, an inner panel 14, a water shield 16 and an interior trim panel 17 shown schematically. The exterior panel 12 forms the exterior surface of the door assembly 10. The inner panel 14 is secured to the exterior panel 12 by various means including crimping and welding. The exterior panel 12 and the inner panel 14 constitute an exterior panel assembly 15. A cavity 20 is defined by the exterior and interior panels 12,14. The interior trim panel 17 is mounted on a surface 22 of the inner panel 14. The interior trim panel 17 is made of either a molded, or thermoformed, plastic sheet or a composite plastic and cloth material or a plastic or wood or metal sheet covered with cloth material.

An upper edge 24 of the cavity 20 is gapped to form a slot whose side edges are covered with resilient edge beads. A glass sheet (not shown) fits within the slot and slides up and down by a mechanical or electro-mechanical mechanism 26 disposed within the cavity 20. Drain or weep holes (not shown) are included at the lower edge of the exterior panel 12 to enable drainage of water and/or dirt that seeps into the cavity 20 around the glass sheet and through the slot. The exterior and inner panels 12,14 further define a window frame 21 and a mirror bracket 23. The glass sheet slides up and down within the window frame 21. A side view mirror (not shown) is attached to the door assembly 10 at the mirror bracket 23.

Although not illustrated, the trim panel includes an outer surface that faces towards the cavity 20 and an inner surface that faces towards a vehicle interior. The interior trim panel 17 includes various apertures through which mechanism that are associated with the door assembly 10 are accessible. For example, a door handle 27 extends through both the water shield 16 and trim panel for actuation by a vehicle occupant and a stereo speaker 28 generates sound waves that pass through openings of the water shield 16 and trim panel. The interior trim panel 17 typically includes irregular surfaces such as bends, depressions and openings for the facilitating the door handle 27, control switches, the stereo speaker 28 and other components contained within the door assembly 10.

Mechanical fasteners are included that secure the interior trim panel 17 to the inner panel 14. The mechanical fasteners may be in the form of so called "Christmas Tree" fasteners which consist of a stud portion having a head fitted within a molded boss formed on the outer surface of the trim panel and springy leg extensions that fit into cooperating fastener holes in the inner panel 14. The irregularities and bends and depressions of the interior trim panel 17 define an interior cavity or space for packaging the mechanical controls or door mounted devices, as discussed above.

The water shield 16 is disposed between the trim panel and the inner panel 14 of the exterior panel assembly 15. The water shield 16 is formed of a semi-rigid or flexible plastic sheet, preferably made of a water impervious thermoplastic, heat resistant material. The particular material may be selected by those skilled in the art from various commercially available types of material suitable for this purpose. More specifically, the material can be any thermally formable material. Preferably, the material includes a thermoplastic polymeric material, such as a thermoplastic olefin (TPO). One such TPO includes a cross-linked polypropelene and polyethylene blend. The water shield 16 also includes a linear low density polyethylene film and a silicon-based coating.

The water shield 16 includes an outer surface 38 that faces the cavity 20 and an inner surface 40 that faces toward the vehicle interior. A substantially continuous, pressure sensitive adhesive stripe or bead 42 (FIG. 4) is applied to the outer surface 38 of the water shield 16. Additionally, individual spots or strips of adhesive 42 are applied at various points on the water shield 16. The adhesive 42 may be covered with a release paper (not shown) to protect against adhering to other surfaces until the water shield 16 is ready to be applied against the inner panel 14. The release paper may be removed to expose the adhesive spots and adhesive strips 42 for adhering to the water shield 16 to the inner panel 14. Pockets, depressions and other reliefs 50 are formed in the water shield 16 to accommodate the various panel contours and devices installed within the door assembly 10 and to facilitate mounting on bosses (not shown).

Figure 3:
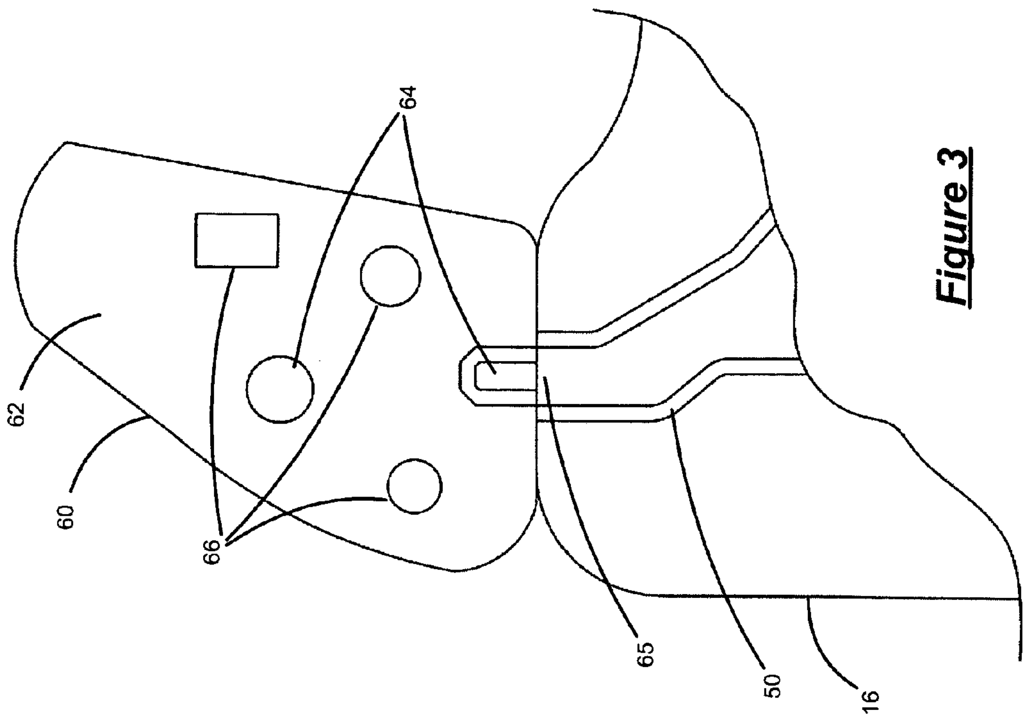
FIG. 3 is a plan view of the mirror seal and a portion of the water shield illustrating alignment of the mirror seal and the water shield.

Referring now to FIGS. 2 and 3, a three-dimensional (3D) mirror seal 60 is shown. The mirror seal 60 is assembled onto the mirror bracket 23. The mirror seal 60 is formed of the same material as the water shield 16. More specifically, the material can be any thermally formable material. Preferably, the material includes a thermoplastic polymeric material, such as a thermoplastic olefin (TPO). One such TPO includes a cross-linked polypropelene and polyethylene blend. The mirror seal 60 also includes a linear low density polyethylene film and a silicon-based coating.

The mirror seal 60 includes a planar sheet 62 having reliefs formed therein. A first set of reliefs 64 accommodate components and contours within the mirror assembly. A second set of reliefs 66 enables indexing and mounting of the mirror seal 60 to a mounting boss formed in the mirror bracket 23. A lower relief 64 aligns with a relief 50 of the water shield 16 to define a channel 65. The channel 65 houses components running between the side view mirror assembly and the door assembly 10. For example, the channel can house wires that enable electrical communication between the side view mirror assembly and a mirror adjustment device mounted to the vehicle door assembly 10. In this manner, a vehicle occupant can remotely adjust the position of a mirror within the side view mirror assembly.

Because vehicles typically include left and right hand side mirror assemblies, traditional mirror seals can be confused and mounted on the incorrect side mirror bracket 23. The 3D reliefs 66 molded into the mirror seal 60 provide index points to ensure proper mounting of the mirror seal 60 onto the mirror bracket 23. Therefore, the mirror seal 60 provides direction to an operator as to proper assembly of the mirror seal 60 into correct side mirror assembly. For example, the reliefs are formed such that an operator would be aware if the mirror seal 60 was being improperly installed or installed on the incorrect side of the vehicle (e.g., right-hand side mirror shield 60 being installed on left-hand side mirror bracket 23).

Figure 4:
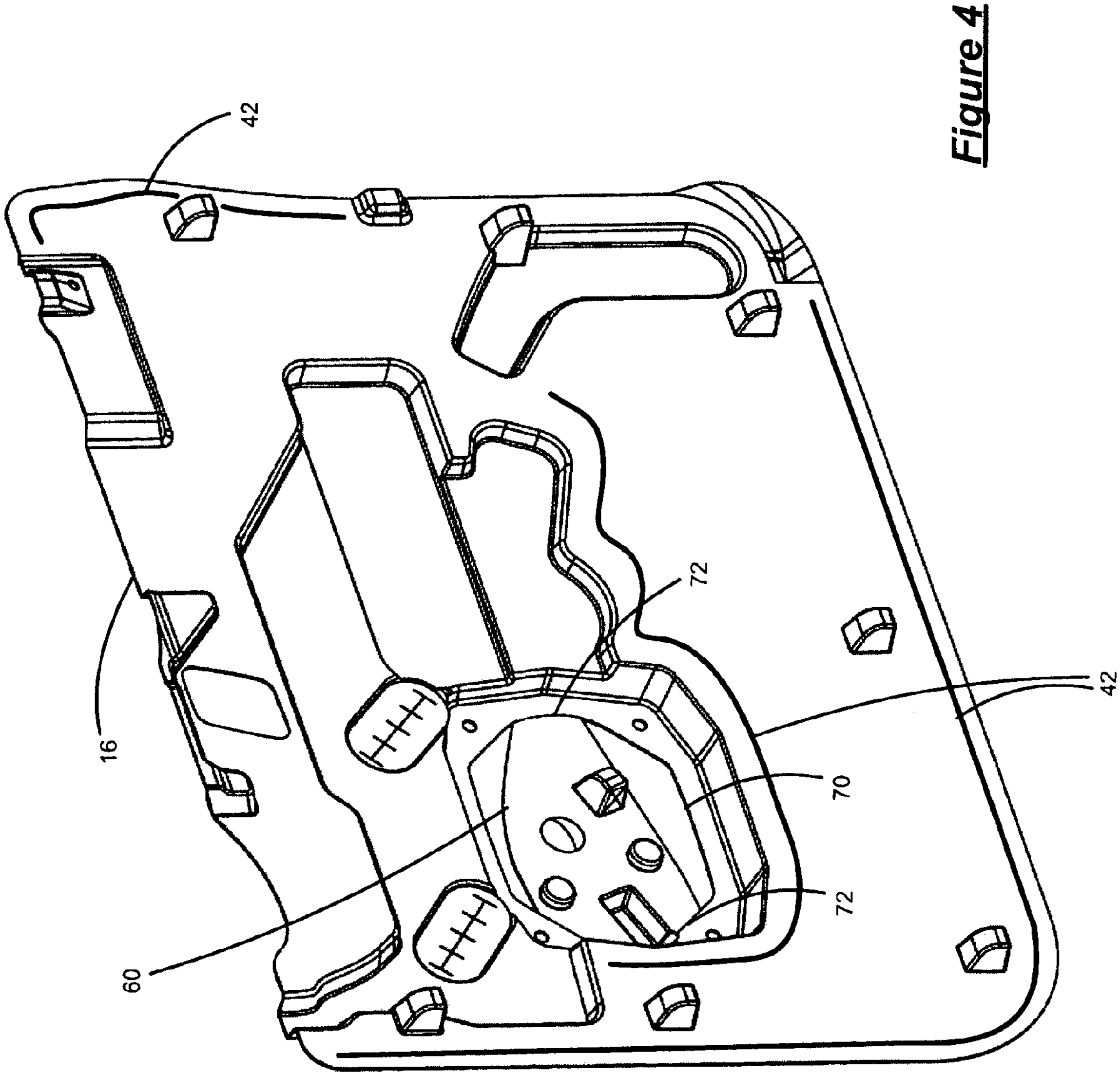
FIG. 4 is a perspective view of the molded water shield of FIG. 1 including the 3D mirror seal integrally molded therein.
Figure 5:
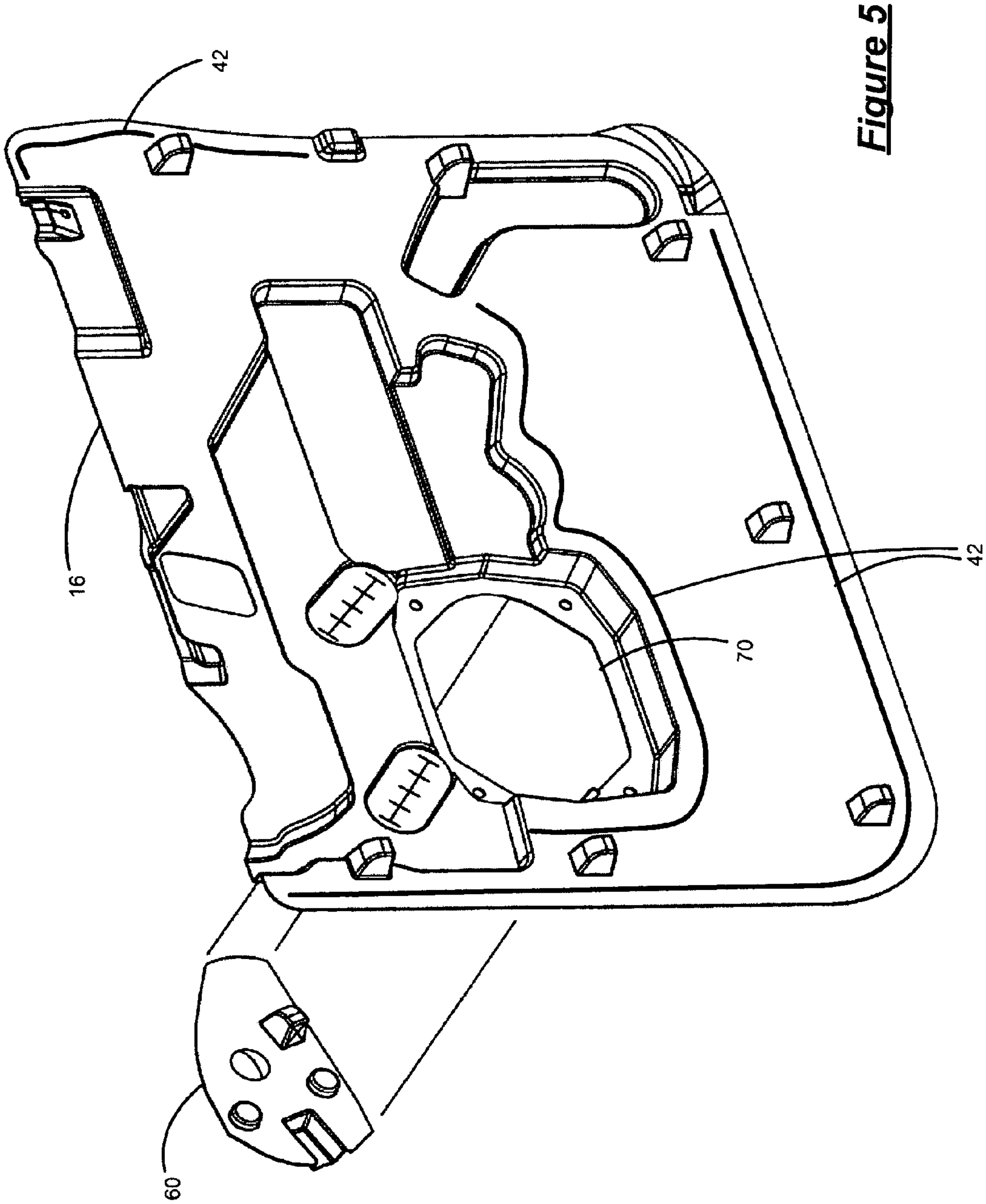
FIG. 5 is a perspective view of the molded water shield and 3D mirror seal separated.

Referring now to FIGS. 4 and 5, the mirror seal 60 is integrally molded into the water shield 16. More specifically, the mirror seal 60 is molded in a space 70 that facilitates mounting of a stereo speaker, although it is anticipated that the mirror seal 60 can be formed in any other sufficiently sized space. Perforated lines 72 are formed at the interface between edges of the mirror seal and edges of the hole. An operator can manually detach the mirror seal 60 from the water shield 16 by tearing along the perforated lines 72.

Because the mirror seal 60 is integrally molded into the water shield 16, each component can be supplied to an assembly line as a single component. The operator simply separates the water shield 16 and mirror seal 60 during assembly. As a result, the water shield 16 and mirror seal 60 are provided using a single part number, reducing logistical considerations. Further reductions are achieved in transportation, handling and storage because the multiple components (i.e., water shield 16 and mirror seal 60) are handled and stored as a single component until the assembly operation occurs.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A molded water shield disposed between an exterior panel assembly and a trim panel of a vehicle door, comprising:

a semi-rigid barrier sheet having a detachable portion formed therein, said detachable portion contoured to sealing engage a first component of a vehicle door and having reliefs formed therein, said detachable portion when removed from said semi-rigid barrier sheet defining an opening through said semi-rigid barrier sheet which accommodates a second component of said vehicle.

2. The molded water shield of claim 1 wherein said semi-rigid barrier sheet and said detachable portion are formed of a water resistant material.

3. The molded water shield of claim 1 wherein said semi-rigid barrier sheet and said detachable portion are formed of a thermally formable material.

4. The molded water shield of claim 3 wherein said thermally formable material is selected from a group consisting of a thermoplastic polymeric material and a thermoplastic olefin (TPO).

5. The molded water shield of claim 4 wherein said TPO comprises a cross-linked polypropelene and polyethylene blend.

6. The molded water shield of claim 1 further comprising a linear low density polyethylene film and a silicon-based coating applied to surfaces of said semi-rigid barrier sheet and said detachable portion.

7. The molded water shield of claim 1 further comprising a pressure sensitive adhesive material that adhesively engages said semi-rigid barrier sheet and said exterior panel assembly.

8. The molded water shield of claim 1 wherein said reliefs enable indexing of said detachable portion for arrangement within a mirror assembly.

9. A molded water shield for a panel assembly of a vehicle door, comprising:

a semi-rigid barrier sheet; and a mirror seal integrally molded into said semi-rigid barrier sheet and having a first set of reliefs formed therein to facilitate indexing of said mirror seal for arrangement with a mirror bracket, said mirror seal detachable from said semi-rigid barrier sheet to define an opening through said semi-rigid barrier sheet.

10. The molded water shield of claim 9 wherein said semi-rigid barrier sheet and said mirror seal are formed of a water resistant material.

11. The molded water shield of claim 9 wherein said semi-rigid barrier sheet and said mirror seal are formed of a thermally formable material.

12. The molded water shield of claim 11 wherein said thermally formable material is selected from a group consisting of a thermoplastic polymeric material and a thermoplastic olefin (TPO).

13. The molded water shield of claim 12 wherein said TPO comprises a cross-linked polypropelene and polyethylene blend.

14. The molded water shield of claim 9 further comprising a linear low density polyethylene film and a silicon-based coating applied to surfaces of said semi-rigid barrier sheet and said mirror seal.

15. The molded water shield of claim 9 further comprising a pressure sensitive adhesive material that adhesively engages said semi-rigid barrier sheet and said panel assembly.

16. The molded water shield of claim 9 further comprising a pressure sensitive adhesive material that adhesively engages said mirror seal and said mirror bracket.

17. The molded water shield of claim 9 wherein said mirror seal further includes a second-set of reliefs contoured to conform to a shape of components associated with said mirror bracket.

18. A vehicle panel assembly, comprising:

an exterior panel assembly that defines a cavity and a mirror bracket; and a molded water shield assembled adjacent said exterior panel comprising:

a mirror seal having a first set of reliefs formed therein for registering said mirror seal with said mirror bracket;

a semi-rigid barrier sheet having an opening defined by a peripheral shape of said mirror seal detached therefrom; and said mirror seal and said semi-rigid barrier sheet being formed of the same material.

19. The vehicle panel assembly of claim 18 wherein said semi-rigid barrier sheet and said mirror seal are formed of a water resistant material.

20. The vehicle panel assembly of claim 18 wherein said semi-rigid barrier sheet and said mirror seal are formed of a thermally formable material.

21. The vehicle panel assembly of claim 20 wherein said thermally formable material is selected from a group consisting of a thermoplastic polymeric material and a thermoplastic olefin (TPO).

22. The vehicle panel assembly of claim 21 wherein said TPO comprises a linear low density polyethylene blend.

23. The vehicle panel assembly of claim 18 wherein said molded water shield further comprises a pressure sensitive adhesive material that adhesively engages said semi-rigid barrier and said mirror seal.

24. The molded water shield of claim 18 further comprising a pressure sensitive adhesive material that adhesively engages said semi-rigid barrier sheet and said mirror bracket.

25. The molded water shield of claim 18 further comprising a pressure sensitive adhesive material that adhesively engages said mirror seal and said mirror bracket.

26. The vehicle panel assembly of claim 18 wherein said mirror seal further includes a second-set of reliefs contoured to conform to a shape of components associated with said mirror bracket.

* * * * *